US005224014A

United States Patent [19]

Fowler et al.

[11] Patent Number: 5,224,014

[45] Date of Patent: Jun. 29, 1993

[54] ELECTRICALLY OPERATED CONTROL DEVICE AND SYSTEM FOR AN APPLIANCE AND METHODS OF MAKING THE SAME

[75] Inventors: Daniel L. Fowler, Kentwood; John M. Douglass, Muskegon, both of Mich.

[73] Assignee: Robertshaw Controls Company, Richmond, Va.

[21] Appl. No.: 878,548

[22] Filed: May 5, 1992

Related U.S. Application Data

[62] Division of Ser. No. 545,906, Jun. 29, 1990, abandoned.

[51] Int. Cl.[5] .............. H02H 3/00

[52] U.S. Cl. .............. 361/185; 361/2; 323/235

[58] Field of Search .............. 361/2, 3, 5, 152, 170, 361/185, 187; 323/235, 319

[56] References Cited

U.S. PATENT DOCUMENTS

| | | | |
|---|---|---|---|
| 3,265,933 | 8/1966 | Perry et al. | 361/3 |
| 3,335,291 | 8/1967 | Gutzwiller | 361/3 |
| 4,296,449 | 10/1981 | Eichelberger | 361/3 |
| 4,745,515 | 5/1988 | Fowler | 361/185 |
| 4,922,363 | 5/1990 | Long et al. | 361/3 |

*Primary Examiner*—Steven L. Stephan
*Assistant Examiner*—Matthew Nguyen
*Attorney, Agent, or Firm*—Candor, Candor & Tassone

[57] ABSTRACT

A control device and system for an appliance and methods of making the same are provided, the control device having a control unit to energize the coil of a relay with a power source at substantially a desired lead point on the voltage wave cycle thereof so as to tend to cause the contacts of the relay to subsequently close substantially at a certain point on the voltage wave cycle each time a load is to be interconnected to the power source whereby a lag time period exists between the desired lead point and a certain point, the control unit having a sensing unit to sense the lag time by detecting when the coil current of the relay coil decreases momentarily by the contacts initially closing during that particular cycle of operation of the control device, the control unit having a unit to automatically adjust the desired lead point should the sensed lag time on a certain previous cycle of operation not cause the contacts to close substantially at the certain point in order to tend to cause the contacts to close substantially at the certain point during future cycles of operation, the sensing unit comprising an indicating transistor in the circuit that is initially turned on by current initially flowing to the relay coil before the contacts close during that particular cycle of operation and is turned off by the momentary decrease of coil current caused by the contacts initially closing during that particular cycle of operation.

6 Claims, 2 Drawing Sheets

ELECTRICALLY OPERATED CONTROL DEVICE AND SYSTEM FOR AN APPLIANCE AND METHODS OF MAKING THE SAME

CROSS REFERENCE TO RELATED APPLICATION

This application is a divisional patent application of its copending parent application Ser. No. 545,906, filed Jun. 29, 1990, now abandoned.

FIELD OF THE INVENTION

This invention relates to a new electrically operated control device and system for an appliance as well as to new methods of making the same.

PRIOR ART STATEMENT

It is known to provide a control device for a control system for an appliance wherein the system comprises a power source of alternating electrical current that has a repeating voltage wave cycle and a repeating current wave cycle and load means for using the electrical current to provide an output of the load means for the appliance, the control device comprising relay means having normally open contact means and coil means for closing the contact means only when the coil means is energized, and electrical circuit means for interconnecting the power source to the load means only through the contact means to provide the output and only when the contact means are closed by the coil means, the control device comprising control means for causing the coil means to close the contact means substantially at a certain point on the voltage wave cycle each time the relay coil means closes the contact means from the open condition thereof whereby the current flow through the contact means at each closing thereof is at substantially a desired level thereof. the control means having means to begin to energize the coil means with the power source at substantially a desired lead point on the voltage wave cycle thereof so as to tend to cause the contact means to subsequently close substantially at the certain point on the voltage wave cycle each time the load means is to be interconnected to the power source whereby a lag time period exists between the desired lead point and the certain point, the control means having sensing means to sense the lag time by detecting when the coil current of the relay coil means decreases momentarily by the contact means initially closing during that particular cycle of operation of the control device, the control means having means to automatically adjust the desired lead point should the sensed lag time on a certain previous cycle of operation not cause the contact means to close substantially at the certain point in order to tend to cause the contact means to close substantially at the certain point during future cycles of operation. For example, see the U.S. Pat. No. 4,745,515 to Fowler.

While the illustrated embodiment of the U.S. Pat. to Fowler, No. 4,745,515, illustrates a parallel relay contact arrangement for detecting the relay pull in time, such patent describes an alternate means as being a transistor circuit that monitors the coil current to determine when the relay armature completes its magnetic circuit because in a typical relay operation the coil current decreases momentarily when the magnetic circuit of the armature is mechanically completed.

For example, such patent states in column 12, lines 11-22, the following:

"There are alternate means of detecting relay pull in time vs. the parallel relay contact arrangement as previously described. For example, one means is a transistor circuit that monitors the coil current to determine when the relay armature completes its magnetic circuit because in a typical relay operation, the coil current decreases momentarily when the magnetic circuit of the armature is mechanically completed. This decreasing of coil current can be detected by a peak sample and hold circuit that will approximate the pull in of the armature and corresponding linkages that operate the relay contact."

However, no transistor circuit is disclosed or described in the U.S. Pat. to Fowler, No. 4,745,515, for so detecting the momentary decrease in coil current.

SUMMARY OF THE INVENTION

It is one feature of this invention to provide a new control device for a control system for an appliance wherein an indicating transistor is disposed in a circuit means of the control device and is initially turned on by current initially flowing through the relay coil means before the contact means of a relay means close during a particular cycle of operation and is turned off by the momentary decrease of the coil current caused by the contact means initially closing during that particular cycle of operation.

Thus, such a control device accomplishes the alternate means set forth in column 12, lines 11-22, of the aforementioned U.S. Pat. to Fowler, No. 4,745,515.

For example, one embodiment of this invention provides a control device for a control system for an appliance wherein the system comprises a power source of alternating electrical current that has a repeating voltage wave cycle and a repeating current wave cycle and load means for using the electrical current to provide an output of the load means for the appliance, the control comprising relay means having normally open contact means and coil means for closing the contact means only when the coil means is energized, and electrical circuit means for interconnecting the power source to the load means only through the contact means to provide the output and only when the contact means are closed by the coil means, the control device comprising control means for causing the coil means to close the contact means substantially at a certain point on the voltage wave cycle each time the relay coil means closes the contact means from the open condition thereof whereby the current flow through the contact means at each closing thereof is at substantially the desired level thereof, the control means having means to begin to energize the coil means with the power source at substantially a desired lead point on the voltage wave cycle thereof so as to tend to cause the contact means to subsequently close substantially at the certain point on the voltage wave cycle each time the load means is to be interconnected to the power source whereby a lag time period exists between the desired lead point and the certain point, the control means having sensing means to sense the lag time by detecting when the coil current of the relay coil means decreases momentarily by the contact means initially closing during that particular cycle of operation of the control device, the control means having means to automatically adjust the desired lead point should the sensed lag time on a certain previous cycle of operation not cause the contact means to close substantially at the certain point in order to tend to cause the contact means to close substantially at the certain point during future cycles of operation, the sensing means comprising an indicating transistor in the circuit means that is initially turned on by current initially flowing through the relay coil means before the contact means close during that particular cycle of operation and is turned off by the momentary decrease of coil current caused by the contact means initially closing during that particular cycle of operation.

Accordingly, it is an object of this invention to provide a new electrically operated control device for an appliance, the device of this invention having one or more of the novel features of this invention as set forth above or hereinafter shown or described.

Another object of this invention is to provide a new method of making such a control device, the method of this invention having one or more of the novel features of this invention as set forth above or hereinafter shown or described.

Another object of this invention is to provide a new electrically operated control system for an appliance, the system of this invention having one or more of the novel features of this invention as set forth above or hereinafter shown or described.

Another object of this invention is to provide a new method of making such an electrically operated control system for an appliance, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
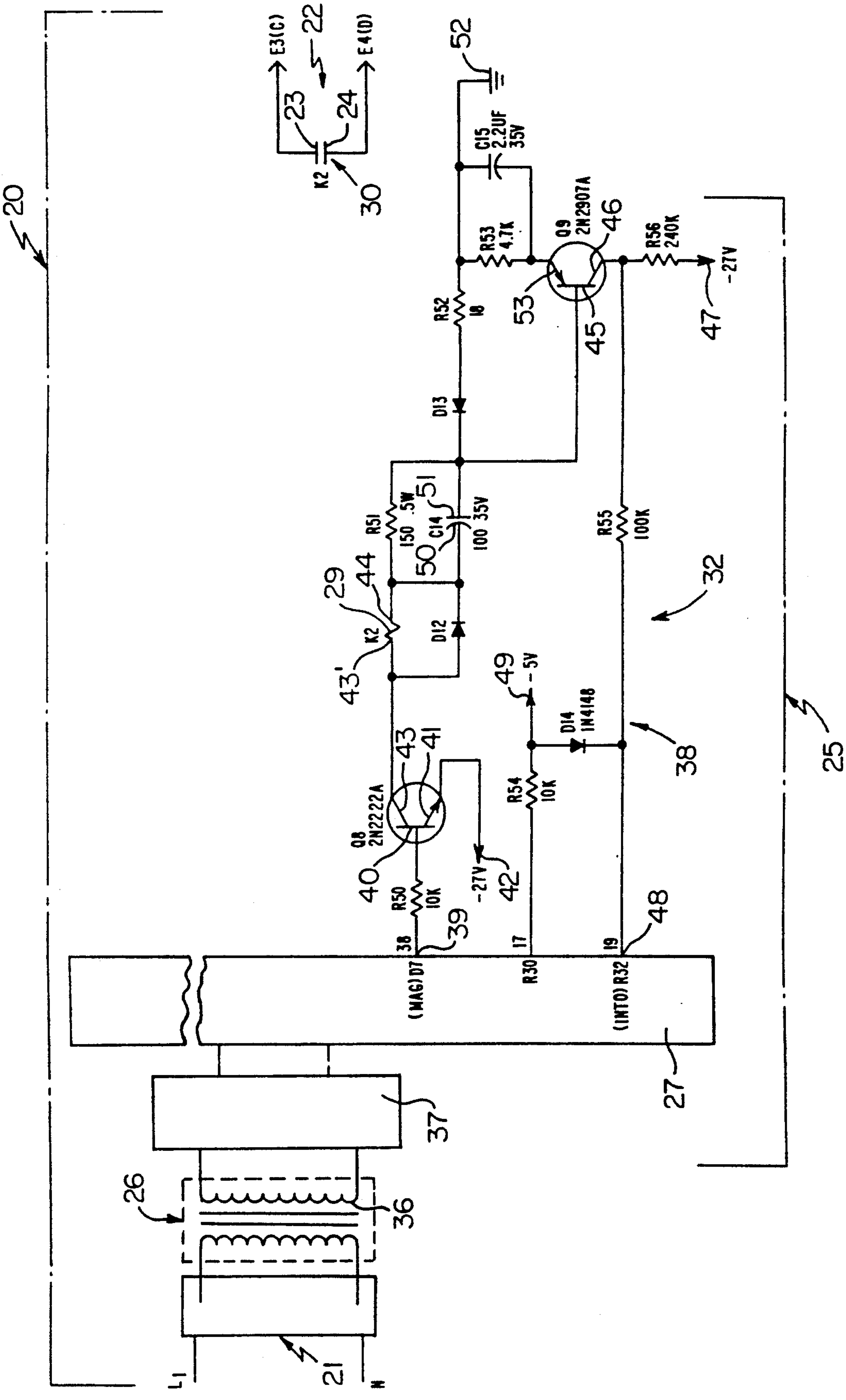
FIG. 1 is a fragmentary view illustrating part of the new system and control device of this invention.

While the various features of this invention are hereinafter illustrated and described as being particularly adapted to provide a control device and system for a particular electrical circuit means for a microwave oven, it is to be understood that the various features of this invention can be utilized singly or in various combinations thereof to provide an electrically operated control device and system for other types of appliances as desired.

Therefore, this invention is not to be limited to only the embodiment illustrated in the drawings, because the drawings are merely utilized to illustrate one of the wide variety of uses of this invention.

Referring now to FIG. 1, the new control system of this invention is generally indicated by the reference numeral 20 and comprises an electrical power source 21 of alternating electrical current that has a repeating voltage wave cycle and a repeating current wave cycle, such as a conventional 120 volt, 15 amp, 60 cycle alternating current source that is normally provided in a home or building for operating appliances. Such electrical power source 21 is illustrated in FIG. 1 as comprising the line L1 and line N.

The control system 20 of this invention also includes a load means that is generally indicated by the reference numeral 22 in FIG. 1 and such load means 22 comprises a magnetron unit for a microwave oven (such appliance not being shown) that utilizes the control system 20, the load means 22 being interconnected to the power source 21 in a manner well known in the art when a pair of relay contacts 23 and 24 are closed and being disconnected from the power source 21 when the relay contacts 23 and 24 open. Such cyclic operation of the load means 22 of a microwave oven under the control of relay contacts is well known in the art as evidenced by the control systems disclosed in the U.S. Pat. to Fowler, No. 4,568,927; the U.S. Pat. to Fowler, No. 4,745,515 and the U.S. Pat. to Schmidt, No. 4,275,464, whereby these three U.S. patents are being incorporated into this disclosure by this reference thereto.

The control system 20 of this invention includes a control device that is generally indicated by the reference numeral 25 and is utilized to control the operation of the load means 22, the control device 25 comprising a transformer means 26, a microprocessor 27 and a conventionally electrically operated relay means that is indicated by the reference designation K2 in the drawings and comprising an electrical coil means 29 and electrical contact means 30 that comprises the contacts 23 and 24.

The control device 25 also comprises an electrical circuit means that is generally indicated by the reference numeral 32 and is adapted to cause the relay coil means 29 of the relay means K2 to close the contact means 30 substantially at a certain point on the voltage wave cycle of the power source 21 each time the relay coil means 29 closes the contact means 30 from the normal open condition thereof whereby the current flow through the contact means 30 is at a substantially desired level thereof all as fully disclosed and described in the aforementioned U.S. Pat. to Fowler, No. 4,745,515, which has already been incorporated into this disclosure.

Thus, since the control device 25 and system 20 of this invention operates substantially in the same manner and for the same reason as the control device and system set forth in the U.S. Pat. to Fowler, No. 4,745,515, only the details of the control device 25 and system 20 necessary to understand the features of this invention will now be described.

The transformer 26 is a 21 volt alternating current source that is in phase with the main power supply 21 and has the secondary coil 36 interconnected to the microprocessor 27 by a part 37 of the circuit means 32 all in a manner fully set forth in the aforementioned U.S. Pat. to Fowler, No. 4,745,515, whereby the microprocessor 27 can derive preferred contact closure points along the voltage wave cycle of the power source 21.

The microprocessor 27 also accurately calculates when the contact means 30 of the relay means K2 actually close so as to determine when the relay coil means 29 must be initially energized in order to compensate for the elapsed pull in time or lag period of the relay means K2, such means comprising the part 38 of the circuit means 32 and will now be described.

The microprocessor 27 has an initiating port 39 interconnected to a base 40 of an initiating transistor Q8 that has its emitter 41 interconnected to a minus 27 volt supply 42 that is provided by the part 37 of the circuit 32 as set forth in the aforementioned U.S. Pat. to Fowler, No. 4,745,515.

A collector 43 of the initiating transistor Q8 is interconnected to one side 43' of the coil means 29 of the relay K2 while the other side 44 of the coil means 29 is interconnected through a resistor R51 to a base 45 of an indicating transistor Q9 that has its collector 46 interconnected through a resistor R56 to the minus 27 volt supply that is indicated by the reference numeral 47 in FIG. 1.

The collector 46 of the indicating transistor Q9 is also interconnected through a resistor R55 to an indicating port 48 of the microprocessor 27. A minus 5 volt supply 49 is also interconnected to the port 48 of the microprocessor 27 at a point intermediate the resistor R55 and the port 48 by a diode D14.

A capacitor C14 is disposed in series with the relay coil means 29 and has one side 50 interconnected to the side 44 of the coil means 29 and to parallel resistor R51 while the other side 51 of the capacitor C14 is interconnected to the parallel resistor R51 and the base 45 of the indicating transistor Q9, as well as to ground 52 by a diode D13 and a resistor R52.

The base 45 and emitter 53 of the indicating transistor Q9 are interconnected to the conductive path or line to the ground 52 by a resistor R53 as well as by a capacitor C15 as illustrated in FIG. 1.

Such an arrangement of the part 38 of the circuit means 32 of the control device 25 operates in the system 20 in a manner now to be described.

When the microprocessor 27 initially biases on the initiating transistor Q8 by sending a signal out of the port 39 to the base 40 thereon the turned on transistor Q8 interconnects the minus 27 volt supply 42 to the coil means 29. The capacitor C14 initially has a low impedance path which charges slowly to a voltage potential established by the current flowing through the parallel resistance path of resistor R51. The charging action of capacitor C14 provides a momentary overvoltage potential to the coil means 29 and thereby accelerates the closure of the contact means 30 in a manner set forth in the aforementioned U.S. Pat. to Fowler No. 4,745,515. The current paths to charge the capacitor C14 and energize the coil means 29 flows from ground 52 through the resistor R52 and the diode D13 and also the parallel path from ground 52 through the capacitor C15 in parallel with the resistor R53 and through the forward biased emitter 53 to the base 45 junction of the indicating transistor Q9.

When sufficient current is flowing through the resistor R52 and the diode D13, the voltage level at the cathode of the diode D13 will bias transistor Q9 to an on state. Therefore, the bias voltage at the cathode of the diode D13 provides the potential for current to flow through the parallel combination of the resistor R53 and the capacitor C15, which forward biases the emitter to base junction of the transistor Q9 to turn it on, resulting in a ground logic level potential at its collector 46. The forward biased emitter to base junction acts as a rectifier diode with a typical voltage drop of 0.7 volts, which charges the capacitor C15 to a peak voltage level equal to the voltage bias level at the cathode of the diode D13 minus the forward voltage drop of the emitter to base junction of the transistor Q9. The charge rate of the capacitor C15 through the emitter base junction of the transistor Q9 is much faster than the discharge path through the resistor R53, therefore the capacitor C15 will track and momentarily store the rectified peak bias voltage at the cathode of the diode D13, which is developed by the current flowing through the resistor R52 and the diode D13 as previously noted. If the current through the resistor R52 and the diode D13 decreases rapidly, the voltage at the cathode of the diode D13 will also decrease rapidly. The voltage across the capacitor C15 is momentarily stored and can be controlled by the resistor R53 to decrease at a slower rate. When the voltage level at the cathode of the diode D13 decreases faster than the voltage stored by the capacitor C15, the emitter to base junction of the transistor Q9 will cease to be forward biased which turns the transistor Q9 to an off state. When transistor Q9 turns off, the ground logic level at the collector 46 is terminated and a negative logic level is supplied through the resistor R56 to the minus 27 volt supply 47.

Figure 2:
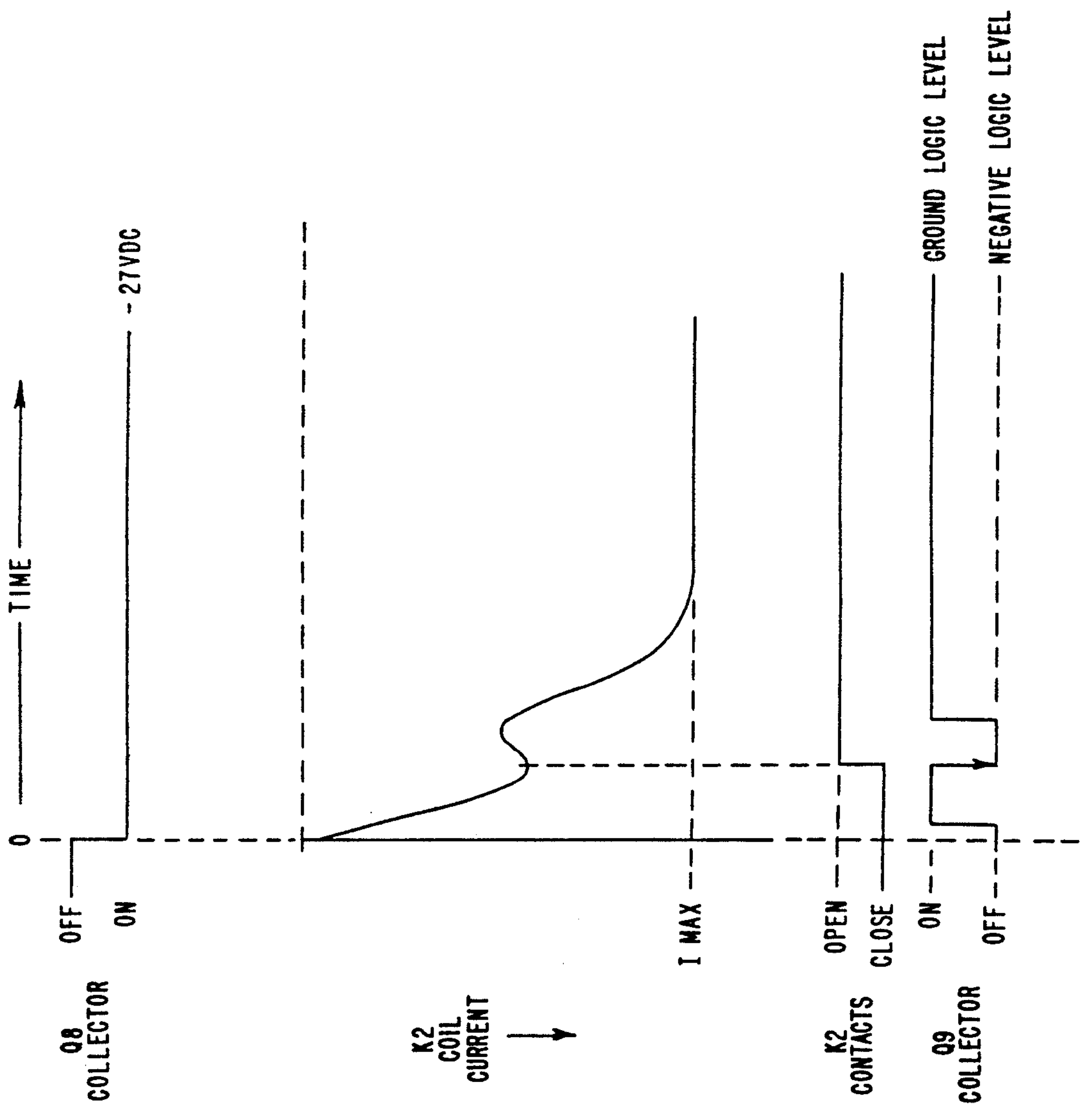
FIG. 2 is a graph illustrating the operation of the system of FIG. 1.

When an electro-mechanical relay is energized, it is a common known characteristic that the coil current will decrease when the armature closes the air gap of the magnetic circuit as illustrated by FIG. 2. This is due to the increased efficiency of the inherent coil inductance which increases the reactive impedance of the circuit. When the air gap is closed, it can be likened to an additional inductor being instantaneously inserted in series with the initial circuit. The current through the additional inductor will lag the voltage applied to it, which results in the net effect of momentarily increasing the circuit impedance. This momentary increase in circuit impedance results in a decrease of the series circuit current flow.

In a series resistive and inductive DC circuit, such as the aforementioned turn on of the transistor Q8 into the inductive load of the relay coil 29, the current through the relay coil 29 and other components of the series circuit will respond as illustrated by FIG. 2. The transistor Q8 is turned on to apply minus 27 volt supply 42 to the collector 43. The reactive impedance of the coil 29 is initially high and slowly decreases, which results in current through the relay coil 29 slowly increasing toward a more negative polarity. This continues until the armature of relay K2, which is mechanically linked to the contacts 23 and 24 closes the air gap of the magnetic circuit. This induces an additional inductive impedance in series with the initial impedance of the coil circuit, which results in a momentary decrease in coil current in a more positive polarity as illustrated in FIG. 2. As current continues to flow, the additional reactive impedance decreases and the initial reactive impedance of the coil also continues to decrease which eventually results in the coil current again increasing in a more negative polarity until the reactive impedance decreases to zero, and only the resistive components of the series circuit limit the current flow.

As noted, when the contact means 30 of the realy means K2 close, the current charging the capacitor C14 as well as passing through the coil means 29 of the relay means K2 momentarily decreases. This decrease in current decreases the potential between the base 45 and the emitter 53 of the transistor Q9 so that the transistor Q9 turns off and the collector 46 of the transistor Q9 is pulled to the minus 27 volt supply 47 as illustrated in FIG. 2. The resistors R56 and R55 limit the current to the microprocessor indicating port 48 and the diode D14 limits the voltage at the indicating port 48 to approximately 0.6 volts below the minus 5 volt supply 49 (the logic LOW rail). The microprocessor 27 sees this at the indicator port 48 as a falling edge or a logic LOW. After this momentary decrease in the coil current through the coil means 29 of the relay means K2, the capacitor C14 is completely charged and the relay hold in current through the resistor R51, the coil means 29, the diode D13 and the resistor R52 climbs to its steady state which biases the indicating transistor Q9 back to its on condition and the transistor Q9 remains on until the transistor Q8 is turned off by the microprocessor terminating the signal to the base 40 thereof.

Thus, it can be seen that the microprocessor 27 detects the closure of the contact means 30 of the relay means K2 after it turns on the transistor Q8 by looking for the falling edge at the indicating port 48, the resistor 53 and the capacitor C15 being wave shaping components selected in order that the microprocessor indicating port 48 sees sharp edges and rapid logic level changes rather than a sloping edge as the indicating transistor Q9 moves through its linear region as it is biased on or off.

Accordingly, with the microprocessor 27 knowing when the contact means 30 of the relay means K2 actually close after the initial signal is sent to the initiating transistor Q8, the microprocessor 27 can adjust when it sends the signal to the transistor Q8 so that the contact means 30 will close at a desired point on the voltage wave cycle of the power source 21.

In this manner, it can be seen that the control system 20 of this invention is adapted to cause the coil means 29 of the relay means K2 to close the contact means 30 substantially at a certain point on the voltage wave cycle of the power source 21 each time the relay coil means 29 closes the contact means 30 from the normally open condition thereof whereby the current flow through the contact means 30 is at a substantially desired level thereof, the circuit means 32 of this invention having means to begin to energize the coil means 29 with the power source 21 (as reduced by the transformer 26) at substantially a desired lead point on the voltage wave cycle so as to tend to cause the contact means 30 to subsequently close substantially at the certain point on the voltage wave cycle each time the load means 22 is to be interconnected to the power source 21 whereby the circuit means 32 compensates for the lag time or pull in time of the relay means K2 and such lag time or pull in time is the time between the desired lead point and the certain point on the voltage wave cycle of the power source 21. In addition, the system 20 of this invention has means to sense the lag time or pull in time of the relay means K2 and has means to automatically adjust the desired lead point should the sensed lag time or pull in time on a certain previous cycle of operation not cause the contact means 30 to close substantially at the certain point in order to tend to cause the contact means 30 to close substantially at the certain point during future cycles of operation of the load means 22.

Therefore, it can be seen that this invention not only provides a new electrically operated control system and control device for an appliance, but also this invention provides a new method of making such a control system.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

We claim:

1. In a control system for an appliance, said system comprising a power source of alternating electrical current that has a repeating voltage wave cycle and a repeating current wave cycle, load means for using said electrical current to provide an output of said load means for said appliance, relay means having normally open contact means and coil means for closing said contact means only when said coil means is energized, and electrical circuit means for interconnecting said power source to said load means only through said contact means to provide said output and only when said contact means are closed by said coil means, said system comprising control means for causing said coil means to close said contact means substantially at a certain point on said voltage wave cycle each time said relay coil means closes said contact means from said open condition thereof whereby the current flow through said contact means at each closing thereof is at substantially a desired level thereof, said control means having means to begin to energize said coil means with said power source at substantially a desired lead point on said voltage wave cycle thereof so as to tend to cause said contact means to subsequently close substantially at said certain point on said voltage wave cycle each time said load means is to be interconnected to said power source whereby a lag time period exists between said desired lead point and said certain point, said control means having sensing means to sense said lag time by detecting when the coil current of said relay coil means decreases momentarily by said contact means initially closing during that particular cycle of operation of said control device, said control means having means to automatically adjust said desired lead point should said sensed lag time on a certain previous cycle of operation not cause said contact means to close substantially at said certain point in order to tend to cause said contact means to close substantially at said certain point during future cycles of operation, the improvement wherein said sensing means comprises an indicating transistor in said circuit means that is initially turned on by current initially flowing to said relay coil means before said contact means close during that particular cycle of operation and is turned off by the momentary decrease of coil current caused by said contact means initially closing during that particular cycle of operation.

2. A control system as set forth in claim 1 wherein said relay coil means has two sides, said control means comprising a capacitor and an initiating transistor for interconnecting a negative voltage supply through said capacitor to one of said sides of said relay coil means when said initiating transistor is turned on, said circuit means interconnecting the other side of said relay coil means to ground, said indicating transistor having a base and an emitter, said circuit means causing a potential to develop between said base and said emitter of said indicating transistor to turn said indicating transistor on when said capacitor begins to charge by said initiating transistor being turned on, said circuit means causing said current charging said capacitor to momentarily decrease when said contact means initially close during that particular cycle of operation of said control device and thereby cause the potential between said base and said emitter of said indicating transistor to decrease and thereby turn off said indicating transistor.

3. A control system as set forth in claim 2 wherein said capacitor is in series with said relay coil means.

4. A control system as set forth in claim 2 wherein said indicating transistor has a collector, said control means comprising a microprocessor having an indicating port for detecting the state of said indicating transistor, said circuit means interconnecting said collector of said indicating transistor with said indicating port.

5. A control system as set forth in claim 2 wherein said circuit means causes said capacitor to charge to a steady state after said contact means initially close and thereby cause said indicating transistor to turn back on until said initiating transistor is turned off.

6. A control system as set forth in claim 5 wherein said microprocessor has a control port interconnected to said initiating transistor by said circuit means to turn on and off said initiating transistor.

* * * * *

UNITED STATES PATENT AND TRADEMARK OFFICE

CERTIFICATE OF CORRECTION

PATENT NO. : 5,224,014

DATED : June 29, 1993

INVENTOR(S) : Daniel L. Fowler, et. al.

It is certified that error appears in the above-indentified patent and that said Letters Patent is hereby corrected as shown below:

On the Title page, after item [73], Assignee, insert the following:

[*] Notice: The portion of the term of this patent subsequent to August 11, 2009, has been disclaimed.

Signed and Sealed this

Twenty-eighth Day of June, 1994

Attest:

BRUCE LEHMAN

*Attesting Officer* *Commissioner of Patents and Trademarks*